(12) United States Patent
Kreizinger (10) Patent No.: US 10,760,271 B2
(45) Date of Patent: Sep. 1, 2020

(54) ADDITIVE MANUFACTURED MULTI-COLORED WALL PANEL

(71) Applicant: Kenneth Robert Kreizinger, Fort Lauderdale, FL (US)

(72) Inventor: Kenneth Robert Kreizinger, Fort Lauderdale, FL (US)

( * ) Notice: Subject to any disclaimer, the term of this patent is extended or adjusted under 35 U.S.C. 154(b) by 0 days.

(21) Appl. No.: 16/681,872

(22) Filed: Nov. 13, 2019

(65) Prior Publication Data
US 2020/0165822 A1  May 28, 2020

Related U.S. Application Data

(60) Provisional application No. 62/771,242, filed on Nov. 26, 2018.

(51) Int. Cl.

| | | |
|---|---|---|
| *B28B 1/16* | (2006.01) |
| *B29C 41/22* | (2006.01) |
| *B29C 71/00* | (2006.01) |
| *B29C 71/02* | (2006.01) |
| *E04C 2/38* | (2006.01) |
| *E04C 2/288* | (2006.01) |
| *B28B 23/02* | (2006.01) |
| *B33Y 10/00* | (2015.01) |
| *B28B 1/00* | (2006.01) |
| *B33Y 80/00* | (2015.01) |

(Continued)

(52) U.S. Cl.
CPC ............... *E04C 2/38* (2013.01); *B28B 1/001* (2013.01); *B28B 23/02* (2013.01); *B29C 64/10* (2017.08); *B29C 64/106* (2017.08); *B29C 64/112* (2017.08); *B29C 64/118* (2017.08); *B32B 13/045* (2013.01); *B33Y 10/00* (2014.12); *B33Y 80/00* (2014.12); *E04C 2/288* (2013.01); *B29L 2009/00* (2013.01); *B29L 2031/00* (2013.01)

(58) Field of Classification Search
CPC ........... B28B 1/001; B28B 1/16; B28B 23/02; B29C 41/22; B29C 64/10; B29C 64/106; B29C 64/112; B29C 64/118; B29C 71/00; B29C 71/02; B29L 2009/00; B29L 2031/00; B32B 13/045; E04C 2/044; E04C 2/305; E04C 2/38
USPC ........ 264/236, 255, 256, 308, 333; 156/242, 156/245

See application file for complete search history.

(56) References Cited

U.S. PATENT DOCUMENTS

| | | |
|---|---|---|
| 3,145,502 A | 8/1964 | Rubenstein |
| 4,031,684 A | 6/1977 | Shibata |

(Continued)

FOREIGN PATENT DOCUMENTS

| | | |
|---|---|---|
| DE | 102006057039 | 12/2008 |
| WO | 2009140760 A1 | 11/2009 |

*Primary Examiner* — Leo B Tentoni (57) ABSTRACT

This invention is an additively manufactured wall panel using computer aided design (CAD) and computer aided manufacturing (CAM) to design and manufacture multi-colored and multi-layered wall panels. This results in a variety of highly attractive, multi-colored wall panel faces ranging from brick, colored grout lines and multi-colored stones to multi-colored geometric designs. The design and manufacturing process greatly reduces the amount of precast cementitious materials by efficiently using higher quality materials. This reduces cost and weight while simultaneously producing a much more comprehensive, multi-functional wall panel complete with an interior frame, exterior insulation and an air, vapor and moisture barriers.

14 Claims, 6 Drawing Sheets

(51) Int. Cl.
  *B29C 64/106*   (2017.01)
  *B32B 13/04*    (2006.01)
  *B29C 64/10*    (2017.01)
  *B29C 64/118*   (2017.01)
  *B29C 64/112*   (2017.01)
  *B29L 9/00*     (2006.01)
  *B29L 31/00*    (2006.01)

(56) References Cited

U.S. PATENT DOCUMENTS

| | | |
|---|---|---|
| 4,153,401 A | 5/1979 | Longinotti |
| 4,656,722 A | 4/1987 | Armstrong |
| 5,002,817 A | 3/1991 | Jones |
| 5,216,616 A | 6/1993 | Master |
| 5,735,094 A | 4/1998 | Zember |
| 5,795,513 A | 8/1998 | Austin |
| 5,885,502 A | 3/1999 | DeAngelis et al. |
| 5,900,180 A | 5/1999 | Scott et al. |
| 6,030,199 A | 2/2000 | Tseng |
| 6,237,294 B1 | 5/2001 | Rygiel |
| 6,808,667 B2 | 10/2004 | Nasvik et al. |
| 7,527,236 B2 | 5/2009 | Nasvik |
| 7,647,738 B2 | 1/2010 | Nasvik |
| 8,147,233 B2 | 4/2012 | Morey et al. |
| 8,201,373 B2 | 6/2012 | Clark |
| 9,919,499 B2 | 3/2018 | Kreizinger |
| 10,053,833 B2 | 8/2018 | Baumgartner et al. |
| 10,294,668 B2 | 5/2019 | Kreizinger |
| 10,301,823 B2 | 5/2019 | Kreizinger |
| 2005/0210811 A1 | 9/2005 | Nasvik |
| 2009/0235600 A1 | 9/2009 | Logan |

ADDITIVE MANUFACTURED MULTI-COLORED WALL PANEL

CROSS REFERENCE TO RELATED APPLICATIONS

This application claims the benefit of the filing dates of U.S. Provisional Application No. 62/771,242 filed Nov. 26, 2018 and incorporated herein by reference.

INVENTION BACKGROUND

This invention is a additively manufactured wall panel using computer aided design (CAD) and computer aided manufacturing (CAM) to design and manufacture multi-colored and multi-layered wall panels. This is accomplished through a process that combines precast concrete methods with 3D printing.

Precast concrete has long been known to produce massive wall panels that each weigh thousands of pounds and are thereby expensive to ship and even more expensive to install. Architectural precast is also known for producing attractive exterior wall finishes using different colored concrete and/or colored aggregates. However, architectural precast is one of the most expensive building systems available, costing several times that of most other building systems.

One of the problems with precast concrete is that everything about it is big, heavy and hard and must be handled accordingly. For example, precast concrete is typically a four to eight inch thick solid concrete slab weighing 40 to 80 psf. This results in a 200 square foot wall panel weighing four to eight tons and requiring costly shipping and large cranes for handling and installation. It also results in an expensive, single function cladding to which materials directed to most other wall functions must be job-site attached after the wall panels are installed.

Precast concrete manufacturing is also problematic in that the panels are made using larger sand particles and at least ⅜" rocks that can be highly abrasive when cast onto forms. This abrasion requires more durable and expensive forms or limits the number of uses of form liners. This is why most precast uses steel forms which results in only flat wall faces or costly steel form fabrication. Precast concrete is also stuck in the tradition of concrete practices which means the wall panels are thick, steel reinforced, heavy and have limited design potential. Finally, precast has design limitations that prevent a much broader utilization of multi-colors and textures.

The process of 3D printing, a/k/a additive manufacturing is a process of making three dimensional solid objects from a digital file. The typical process for 3D printing concrete buildings is well known in the art and is based on CAD/CAM whereby a computer program is used to design a building's walls and a computer controlled robotic arm manufactures them in place or in a factory. Basically the robotic arm is directed by the program to travel along a set horizontal path while extruding a bead of low slump concrete on top of a prior pass of the arm and bead of concrete. The concrete beads are extruded from the arm in a size of about one to three inches in diameter and produce an unfinished, stacked pancakes appearance from the multiple beads laid upon one another.

This 3D printing process leaves much to be desired in that the wall face on both sides are rough and must be textured or otherwise covered and there is no efficient way to provide attractive claddings or multi-color finishes to the walls. The 3D printed walls also provide minimal building wall functions of an enclosure and structural support with all other typically required functions, such as thermal insulation and air, vapor and moisture barriers, separately added. These 3D printed walls also face the unresolved issues of meeting US building codes.

There are multiple processes disclosed by which multi-colored precast concrete has been produced. U.S. Pat. No. 3,145,502A (Rubenstein) disclosed stencils laid over the mold face before spraying a resin face layer and then removing the stencil to spray a resin backing layer. U.S. Pat. No. 4,153,401A (Longinotti) disclosed partition units lowered onto a mold cavity to keep different colored mortar separate during casting, after which the partitions are immediately raised from the mold. U.S. Pat. No. 4,656,722A (Armstrong) discloses a brick pattern form over which a single color concrete is cast. U.S. Pat. No. 5,002,817A (Jones) discloses brick pattern form liner with raised grout dividers and method for forming concrete panels with single color concrete. U.S. Pat. No. 5,735,094 (Zember) discloses a template, i.e. stencil, placed over a first color after which a second color is applied and the stencil removed to expose the first color.

Relative to 3D printing, there are far fewer disclosures that may be applicable to precasting. For example, U.S. Pat. No. 5,216,616A (Masters) discloses system for producing 3D objects from computer generated coordinates whereby a first dispenser places material while second dispenser builds material dividers. U.S. Pat. No. 6,030,199A (Tseng) discloses a method for forming a 3D object by computer control of planar deposition of molten forming materials. DE102006057039 (Parsch Egon) discloses a computer controlled concrete block maker that discharges clumps of different colored concretes in a predetermined shape and position, side-by-side or on top of one another, in a flat faced mold which is then vibrated.

While the present utilization of 3D printing structural walls has much to overcome, the use of CAD/CAM has been successfully implemented in many industries and holds much potential for precast wall panels. A such, there is a need to adapt the CAD/CAM process to horizontally cast, precast wall panels. There is also a need to improve the material efficiency of precast wall panels by using less, although higher quality materials, to produce less costly, lighter and easier to install wall panels. There is also a need to use less abrasive cementitious materials to enable the use of less costly and more versatile forms. There is also the need to improve the effectiveness of precast walls by making them a more comprehensive wall system incorporating insulation, an air, vapor and moisture barriers and simplifying interior finishes. Finally, there is also the need to increase the wall panel's face design flexibility and attractiveness by incorporating more multi-colored designs and textures.

SUMMARY OF INVENTION

This invention is a additively manufactured wall panel using computer aided design (CAD) and computer aided manufacturing (CAM) to design and manufacture multi-colored and multi-layered wall panels. This is accomplished through a process that combines 3D printing with precast concrete methods. The CAD/CAM process also facilitates factory installed insulation and air, vapor and moisture barriers as well as a frame to support interior wallboard.

The wall panels of the present invention improves the effectiveness of precast walls by casting wall panels in layers of different materials with each layer providing one or more functions, most of which are superior to those presently provided by precast walls. The invention's first layer is the wall face layer which provides the wall's attractiveness and face durability. Additional layers, which may be in a different order, include a cementitious, fiber reinforced backing layer for impact, fire and water resistance and a layer of polyurethane foam, which is a multi-functional material that provides thermal and acoustical insulation, an air, vapor and moisture barrier and water and impact resistance. Other layers may be added to enhance any of the above functions or to add other functions as may be desired.

The present invention builds better exterior walls faster by first; manufacturing walls with much more attractive and even elegant exterior finishes than possible with traditional precast. Finishes refers to the color, texture, detail and design of the wall face. This is accomplished by using multiple, integrally colored, cementitious face materials precisely arranged on a form face by 3D printers. Multiple colors provide a more vibrant and distinct differentiation between adjacent wall face areas that cannot be achieved with only wall face reveals or changes in texture. The 3D printers are more accurately referred to herein as 3D dispensers that discharge different colored materials, side-by-side, in any design imaginable. The 3D dispensers also apply this colored face material into form indentations or onto form protrusions which become wall face ornamentations that may have a different color than other parts of the wall face. In addition, the wall face layer uses cementitious materials having little to no abrasive aggregates which enables the use of less durable and thereby less expensive forms. Furthermore, these less durable forms, such as plastic or coated wood, provide much more design flexibility than typical precast steel forms.

The 3D dispensers may also be used to cast grout lines as brick, stone or geometric shape boundaries on a form face after which the 3D dispensers cast a different colored material within the boundaries to produce a wall face having grout lines distinguished from red bricks, multi-colored stones or geometric shapes. The 3D dispensers may also create simulated granite wall faces by spraying multiple passes of different colored speckles on a form face, or create simulated marble by printing marble veins on a form face and then casting a swirled color over and around the veins.

The present invention also discloses special forms faces designed to maximize the efficiency of the 3D dispensers to produce multi-colored wall faces. For example a form face may have raised boundaries around a multitude of stone faced molds with 3D dispensers filling each mold with a different colored face layer. After which a white backing layer is cast on top of the raised boundaries and the filled molds to create grout lines that will show on the wall panel's face.

The present invention also discloses form edging devices and techniques to facilitate multiple uses of larger forms with textured form faces to produce smaller wall panels. The devices and techniques can also be used to create window and door openings on textured form faces.

Better walls are also built by using more durable surfaces, better insulation and better air, vapor and moisture control barriers for a more comfortable environment. More durable surfaces are accomplished by using face layer material additives and fibers. For example polyvinyl alcohol (PVA) fibers can greatly increase the impact and crack resistance as well as weather durability of a face layer and, since the face layer is thin the cost of these fibers in minimal. Better insulation and control barriers are provided by a spray polyurethane foam layer which is a high quality, multi-functional building product. Such a foam layer also provides continuous, exterior insulation for buildings constructed with the present invention.

The present invention also uses fewer and better materials. Instead of four to eight inches of solid concrete in typical precast, only about one-half to one inch of cementitious materials are typically used in the present invention. This saves resources and reduces negative environmental impacts associated with using so much concrete. Instead, the present invention uses much more effective, although more expensive, materials to produce a better wall. For example, while typical precast is reinforced with heavy steel mats to provide a wall panel's structural support, the present invention's cementitious layers may not be structural and are attached to an inexpensive light metal or wood frame for structural support. Such a frame provides other functions such as supporting interior wallboard.

Wall panels are herein defined as vertical structures, precast, with two or more wall face colors, on forms having a form face and having at least 80 square feet in wall face area, including openings, and used for all types of walls. Specifically excluded are precast structures used as horizontal concrete slabs such as floors, roof and sidewalks panels, stepping and paving stones and concrete blocks smaller than 80 square feet in face area.

The present invention uses less labor through CAM automation which reduces costs while shifting monotonous work to machines. However, automation also leads to higher paying jobs associated with more sophisticated job requirements of running the machines.

Accordingly, one advantage of the inventive subject matter is that it facilitates the utilization of a CAD/CAM in the design and production of precast wall panels.

Another advantage of the inventive subject matter is that computer controlled 3D dispensers discharge different colored face materials in a myriad of wall panel designs.

Another advantage is that some of the multi-colored wall panel designs included colored grout lines separating different colored bricks or stones on a wall panel face.

Another advantage is that colored grout lines may be cast by 3D dispensers instead of using form liners to distinguish the grout lines from the bricks or stones.

Another advantage is 3D dispensers can be programmed to print a granite wall panel face by spraying multiple passes of different colored speckles on a form face.

Another advantage is wall panels may be simply manufactured with multi-colored, geometric shapes using CAD/CAM.

Another advantage is 3D dispensers can be programmed to print marble veins on a form face and to spray or pour a swirled color over and around the veins to produce a marble wall panel face.

Another advantage is wall panel design and manufacturing is highly automated using computer aided design and computer aided manufacturing.

Another advantage is special surface forms are used to provide clean panel edges on a heavy textured mother form and thereby get more production out of a mother form.

Another advantage is using lower costing forms since the cementitious face layer cast against the forms contains little or no abrasive materials.

Another advantage is wall panels may be cast with protruding window and door mouldings of the same or different color than the adjacent flat wall face area.

Another advantage is spray polyurethane foam may be applied to the backside of a wall panel to provide support and continuous, exterior insulation for a building that uses the wall panels.

Another advantage is spray polyurethane foam may be used to provide an air, vapor and moisture barrier to a precast wall panel.

Another advantage is spray polyurethane foam may be used to automatically bond a structural frame to a precast wall panel.

Other objects, advantages and features of the inventive subject matter will be self evident to those skilled in the art as more thoroughly described below.

DETAILED DESCRIPTION ACCORDING TO THE PREFERRED EMBODIMENTS OF THE PRESENT INVENTION

This invention is a additively manufactured wall panel using computer aided design (CAD) and computer aided manufacturing (CAM) to design and manufacture multi-colored and multi-layered precast wall panels. This is accomplished through a process that combines 3D printing with precast concrete methods. The wall panels of this invention are computer aided designed and computer aided manufactured (CAD/CAM), in whole or in part, in a process that facilitates factory installed insulation and air, vapor and moisture barriers.

The wall panels of this invention are manufactured by casting layer upon layer of different materials that bond together and accomplish different purposes. In its most simple configuration a panel has only two layers, a face layer comprised of an attractive, multi-colored exterior finish, cast by a 3D printer on a form face, and a separately cast backing layer that provides some degree of structural support to the face layer. Such a panel may result in having a multi-colored stone decorative face layer backed by a much thicker layer of fiber reinforced concrete.

For purposes of this disclosure 3D printers will hereafter be referred to as 3D dispensers that are computer controlled and may also be referred to as CAM (computer aided manufacturing) dispensers. The 3D dispensers are designed to cast a freshly mixed cementitious material ranging from a liquefied, i.e. high slump, to a semi-solid, i.e. low slump mix. Since different layers may be comprised of different cementitious materials or materials with different slumps, the dispensers may vary in features and operation as necessary to dispense the different materials. Computer controlled means a program has been loaded into a computer which then directs the operation of the dispensers and other machines as is well known in the art.

In one embodiment of the present invention, a finished wall panel face has simulated mortar or grout lines or actual gaps between a multitude of individual, integrally colored brick or stone faces. The mortar or grout lines are slightly recessed from the brick and stone faces and typically of a different color. Narrow gaps simulate a separation between individual stacked stones with the gaps recessed up to one inch from the stone face. The individual brick or stone faces may be of the same or different colors such that a panel may have different colored bricks or stones faces intermingled with each other. For example different shades of red brick faces may be intermingled on a panel face, all separated by white mortar lines.

In one embodiment, a wall face is created with intermingling, different colors of bricks or stones separated by colored lines or gaps by using forms with special form faces and 3D dispensers. For example, a horizontal form is comprised of a multitude of individual brick or stone faced molds separated by dividers protruding from the form face. The 3D dispensers then fill the individual molds with different, integrally colored material as directed by a computer. As such the computer directs each 3D dispenser to place a specific amount and thickness of material in a specific spot or over a specific area. The dividers provide a distinct separation of the different colored materials over the form face.

Figure 1:
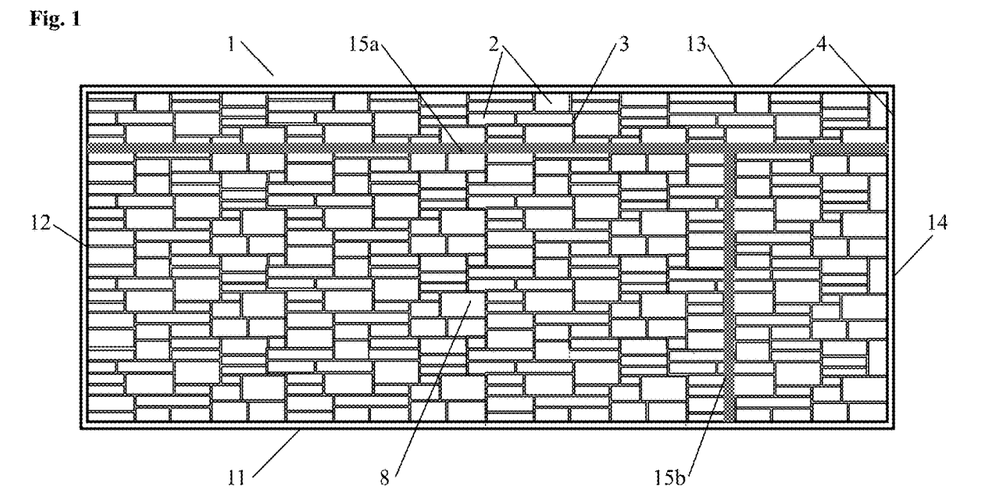
FIG. 1 is a form for a precast stoned faced wall panel containing a stone mold field.

Similar to precast and as shown in FIG. 1, a wall panel can be manufactured horizontally in an open form 1 containing a multitude of individual brick, block or stone molds 2 separated by vertical dividers 3. Such a mold field is surrounded by and contained within the form's perimeter 4. While the form 1 may be of any shape, a rectangular form's perimeter 4 is comprised of a bottom edge 11, a first side edge 12, a top edge 13 and a second side edge 14. The forms may be fabricated with any type of design or texture and with or without vertical dividers. Since changing forms is time consuming and such forms are expensive, it is preferable they are constantly used for a number of times. This may be accomplished by fabricating a large mother form 1 that can be used to make a variety of smaller and different sized wall panels within the larger form.

Figure 3:
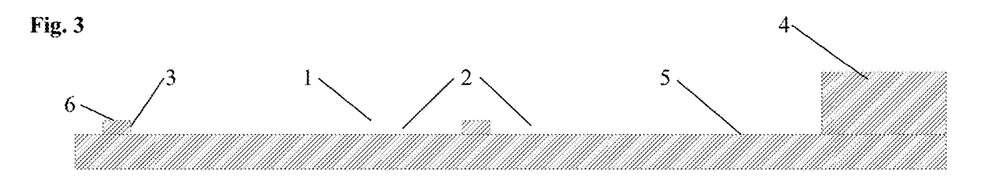
FIG. 3 is a section view of a brick faced form showing multiple brick molds.
Figure 4:
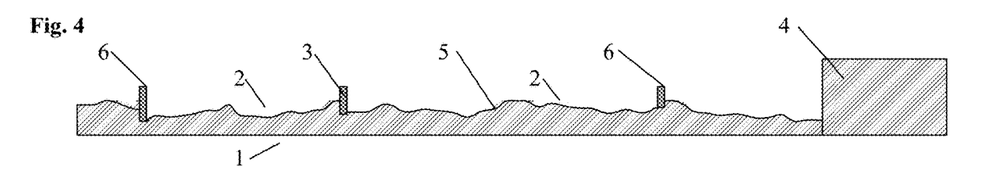
FIG. 4 is a section view of a stone faced form having a multitude of vertical dividers with their crowns all in the same plane.
Figure 14:
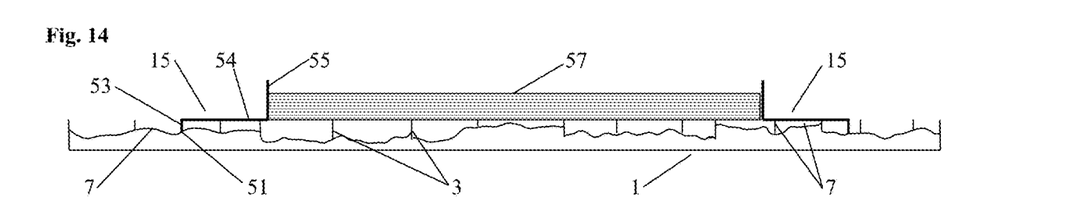
FIG. 14 is a form with an irregular form face and a multitude of vertical dividers and two spaced apart surface forms.

FIG. 1 shows such a process with a smaller formed area 8 enclosed by the bottom form 11, the first side edge 12 and two surface forms 15a and 15b that form the top and other side edge of the formed area 8. Surface forms are temporary perimeter forms positioned on a mother form's surface to form one or more perimeter edges for a smaller panel formed in a larger form and to form window and door openings on a form. Since a precast job typically includes several panels having the same height although different lengths, a top surface form 15a may be left in place on the mother form and only the side edge surface form 15b be moved to form the different lengths. The ability to only change a single form side creates a highly efficient form preparation process. While surface forms used on smooth or lightly textured, flat form faces, as shown in FIG. 3 for example, are well known, surface forms for heavy textured form faces such as stone faces, as shown in FIGS. 4 and 14 for example, are new. Surface forms used on heavy textured form faces are called heavy textured surface forms.

When casting panels in such a form, it is preferable to always use the form's bottom edge 11 and first side edge 12 to form the bottom and one end of wall panels. This simplifies form preparation and also enables the corner between the bottom and side to provide a fixed coordinate reference point from which the CAM dispensers and other CAM equipment are programmed to operate.

Figure 2:
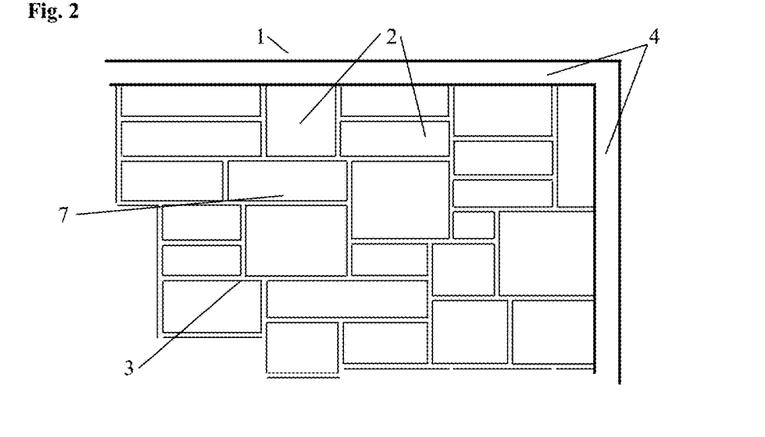
FIG. 2 is an enlargement of a corner section of FIG. 1 showing individual stone molds separated by vertical dividers.

FIG. 2 is an enlargement of a corner section of FIG. 1 showing form 1 having a perimeter 4 and a form face 7 comprised of a multitude of molds 2 separated by vertical dividers 3. Each mold face may be smooth, textured, flat or irregular, or any combination thereof. Since the panels are cast face down, the mold faces determines the panel's finished face. While the form face is defined as the entire form surface against which material to be formed is cast, the mold face is the form surface for each individual mold and may be different from mold to mold. Form faces, in whole or in part, comprise any texture, including smooth, with any amount of indentations or recess and/or protrusions with or without vertical dividers and molds as herein disclosed.

FIG. 3 is a section view of a brick faced form 1 showing multiple brick molds 2 having a mold face 5 on it's bottom, that in this case is flat with a brick like texture. Each mold 2 has a length, width and depth determined by vertical dividers 3 surrounding each mold 2 to separate the molds 2 from each other. The vertical dividers have a top, i.e. a crown 6, and preferably have tapered sides that are wider at the mold's face 5 and more narrow at the crown 6. A taper facilitates removing the finished panels from the form as is well known in the art. Vertical dividers 3 are arranged in such a pattern to produce a panel having a face that simulates a brick, stone or other any type of wall face design. The crown 6 is from 0.06" to 48" wide and used to simulate a variety of wall face features. For example to simulate mortar or grout lines the crown 6 may be from 0.18" to 1" wide. For use on geometric designed wall faces, including reveals, the crowns may be up to 48" wide and to create narrow gaps to simulate individual stacked stones, the crowns may be form 0.06" to 18: width.

In order to simulate a brick wall, the brick face form 1 of FIG. 3 has vertical dividers 3 spaced apart by the width and length of actual bricks, which is typically 2.25"×8" respectively. The vertical divider's 3 height in such a brick faced form is about 0.06" to 0.12" high which produces a 0.06" to 0.12" recessed mortar line on the finished panel face. Assuming a 0.12" high vertical divider 3, the volume of face layer material a 3D dispenser will discharge into each brick face mold 2 is about 2.16 in$^3$. Also shown in FIG. 3, the top of the form's perimeter 4 is at a height above the vertical divider's crowns 6 to provide edge forming for a backing layer. The form perimeter's bottom edge and first side as well as the top form side and the second form side are all taller than the crowns to provide formwork for backing layers cast on top of the face layer and vertical dividers.

In another embodiment, as shown in FIG. 4, is a section view of a stone faced form 1 having a multitude of vertical dividers 3 with their crowns 6 all in the same plane. The dividers 3 separate each individual stone mold 2 from each other. In this embodiment the stone surface faces 5 are recessed from 0.12 to about 1" from the divider's crown 6 and have a irregular surface and texture comparable to real stones. This means the vertical dividers range from 0.12" to 1" tall. The degree of recess varies from stone mold 2 to mold 2 such that the finished panel face, when removed from the form, will have some stone faces protruding more than others.

Figure 5:
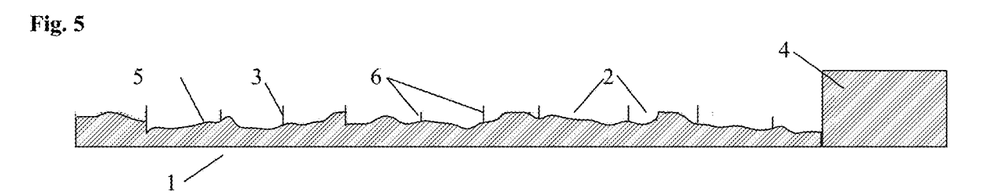
FIG. 5 is a stone faced form similar to FIG. 4, although with thinner vertical dividers.

In another embodiment, as shown in FIG. 5, another stone faced form 1 has irregular stone faces 5 similar to FIG. 4, although the dividers 3 are much thinner and the individual stone molds 2 much closer together. In addition, the divider's crowns 6 are not all in the same plane, with some dividers taller than others. This type of form 1 produces a stack stone panel wherein the panel face has the finish of stones stacked on top of each other, with no visible grout lines and the vertical dividers cause gaps to be visible between the stones on the wall panel face.

Given the above described brick and stone forms, one or more computer controlled dispensers are programmed to cast material into selected molds, filling each mold to or near it's crown, without overflowing. Multiple 3D dispensers may each cast a different colored material into several molds to intermingle the different colored molds to create the panel's face layer. The wall panels described herein all have a multi-colored face layers which makes them a multi-colored wall panel.

In another embodiment a face layer is cast on a form face by a 3D dispenser discharging one or more distinct shapes using a computer controlled design. For example a simulated granite panel face may be created by a multiple 3D dispensers spraying a face layer with multiple passes of different colored materials controlled by a programmed spray pattern. Such a spray pattern controls the spray drop surface area and density to limit the amount of form face area covered by any one color in each pass over the entire form or each particular form area. As each 3D dispenser makes a cumulative pass, colored material is sprayed in a predetermined pattern that covers a predetermined amount of form face area. Subsequent 3D dispenser passes spray material to cover more of the form face until it is fully covered by the sprayed material, after which either additional sprayed passes or a different distinct shape is discharged on top of the sprayed layer to build-up the face layer to it's predetermined, CAD program designated thickness. This results in a speckled colored panel face similar to granite.

Figure 6:
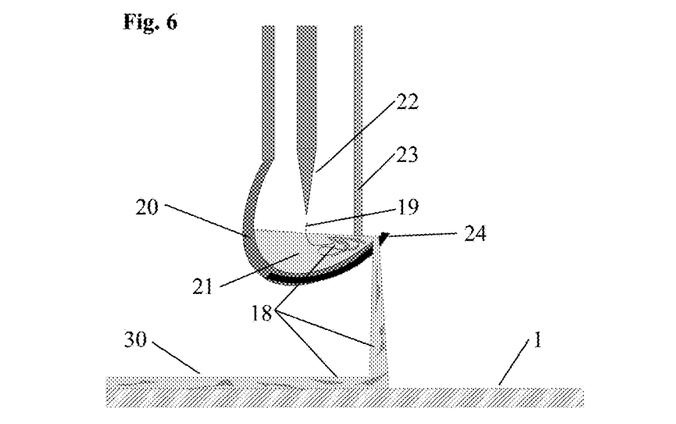
FIG. 6 is an open trough dispenser shown casting swirled colored material onto a form.

Likewise a simulated marble panel face may be created by one or more computer controlled 3D dispensers casting color veins over a form face in a programmed design. Such veins may be created by a 3D dispenser discharging a bead shape onto the form face. Once the veins are cast the remaining face layer can be cast by spraying or pouring one or more base colored materials onto the form face with or without colored swirls worked into the base color. One method of casting swirled colored material onto a form is using an open trough 20 dispenser above a form 1 as shown in FIG. 6. As a base colored material 21 fills the trough 20, an accent colored material dispenser 22 lightly pours an accent color 19 on the top of the base color material 21 and a stir 23 gently stirs the accent color 19 into the base color material 21 as the trough 20 pours the swirled material 18 onto the form 1 as a face layer 30. Such a trough pouring dispenser and accent color dispensing and stirring unit may all be computer controlled. For example the trough 20 dispenser may have a multi-sectioned gate 24 that opens downward to allow material to be poured from the trough 20. Likewise the accent color dispenser 22 and the color stirrer 23 may all be computer controlled.

Figure 7:
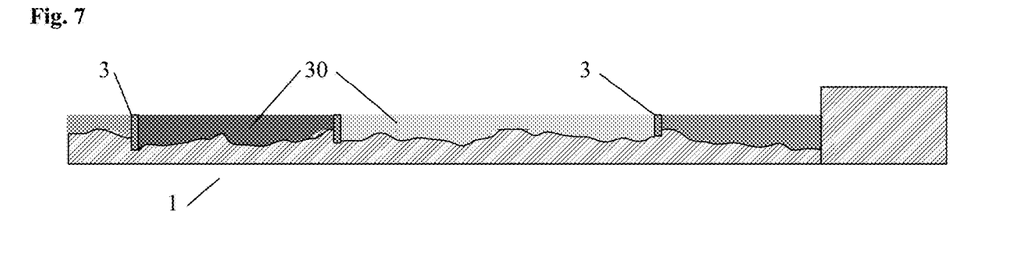
FIG. 7 is a multi-colored face layer cast onto a stone form face.

The panels are cast in layers with a face layer being the first layer. When casting forms comprised of molds, the correct amount of face layer material 30 for each individual mold is computer controlled and automatically dispensed into each mold filling it to the top of the vertical dividers 3 as shown in FIG. 7, which is the form 1 of FIG. 4 with the molds 2 filled with face layer material 30. Typically multiple robotic 3D dispensers simultaneously fill several different molds or areas on the form face with the same or different colored material. If one vertical divider is shorter than the others surrounding a particular mold, the mold is filled to the top of the shortest divider.

Figure 8:
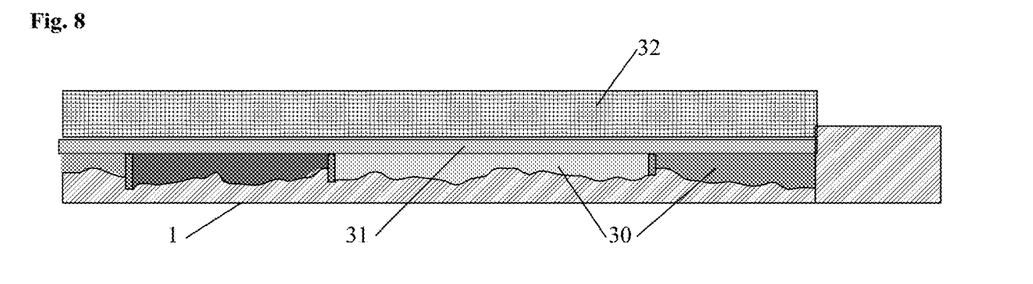
FIG. 8 is FIG. 7 with a backing layer cast onto the face layer.

After the face layer is cast as shown in FIG. 7, a first backing layer 31 is cast on the backside of the face layer 30 as shown in FIG. 8. One or more backing layers are cast over the backside of the face layer to bond the individually cast face sections together as well as provide the panel with a variety of properties produced by the various backing layer materials. For example one backing layer may be used to embed mesh into the panel followed by a another layer containing fibers. All backing layers are bonded to the prior layer, whether it be the face layer or another backing layer.

FIG. 8, shows a second backing layer 32 comprised of spray polyurethane foam poured or sprayed, i.e. cast, on the backside of the first backing layer 31 to provide the panel with a number of features including insulation, an air, vapor and moisture barrier, water and impact resistance and to optionally bond the panel to an embedded frame (not shown). A frame may be attached to a multi-layered panel as part of the panel's fabrication or a finished panel may be attached to a frame or other structure after being removed from a form. For example, a 3D printed wall panel with a spray foam layer may be used as one or both sides of a stay-in-place insulated concrete form or as a stay-in-place bottom form for tilt-up walls. A multi-layered panel may be used for a full wall or may be in much smaller sections that are manually attached to a frame or structure.

The panels are left to cure in the form after the last cementitious layer has been cast. The spray foam layer may be applied to the cementitious backing layer before or after the wall panel has been removed from the form. Thinner cementitious layers will require that the spray foam layer be applied, and in some cases a frame attached, while the panel is still in the form. A wall panel may be removed from the form once all layers cast in the form have sufficiently cured, i.e. hardened, to enable the wall panel's handling.

Similar to 3D printing, the face layer is cast using three dimensional coordinates. Before casting each form is measured and mapped with x, y and z coordinates across it's surface. The coordinates are for length, width and height. This mapping can be accomplished in a number of ways ranging from 3D scanning to physically measuring dimensions and the volume of each individual mold. The data is loaded into a computer and used in programs that directs the computer controlled 3D dispensers to dispense material over the form face surface and inside each individual mold, with relatively precise dispensing start and stop points along with the amount of material needed to fill each individual mold to a predetermined level.

The coordinates for the brick form are relatively simple since the mortar lines are at set intervals and all of the brick face surfaces are at one height and mortar lines at a second height. Since the molds are all mostly identical, the 3D dispensers cast the same amount of material in each full brick mold. For less than full molds around the panel perimeter and at openings for example, a computer will calculate the amount of material to be dispensed in each mold based on a wall panel's computer aided design (CAD) file, as is well known in the art. The coordinates for the stone faced form are more complicated since grout lines and the amount of material to be dispensed in each mold varies. Finally, coordinates for a flat and open form with no vertical dividers is a 3D grid from which any wall panel face layer may be computer designed.

Dispensers are any type of device that dispenses a predetermined amount of material that is capable of being shaped by a form face, with or without vibration. While 3D dispensers are computer controlled, other dispensers may be mechanical or manual. Dispensers may be material specific and dispense only one general type of material such as spraying a liquid material or extruding a bead using a semi-solid material. The material may be dispensed by any process known in the art including extrusion, spraying, flow valves, troughs, gates, etc. Dispensers may be programmed to make a single or multiple passes over each mold or over a form face area. Passes may be cumulative, i.e. on top of one another, and/or adjacent, i.e. beside each other. It is important that the dispensers are drip-proof, in that they do not leak, drip or ooze material while traveling from one mold to the next to prevent spots showing up on a wall face. Dispensers should also be precise in both the amount and location of the material dispensed into a mold and/or onto a form face. When other methods such as vibration are used to move the material or to level the material within a mold, dispensers may be somewhat less precise in dispensing the material. The 3D dispensers are three dimensional dispensers because they discharge material that may be varied by length, width and thickness. This is regardless of whether a 3D dispenser moves in a single or multiple horizontal plane.

CAM dispensers are well known in the art with one example being the 725 HF high flow value system manufactured by Nordson EFD, LLC. This particular machine has up to 4 computer controlled 3D dispensers capable of simultaneously dispensing several gallons of different colored or difference materials on a form.

Figure 9:
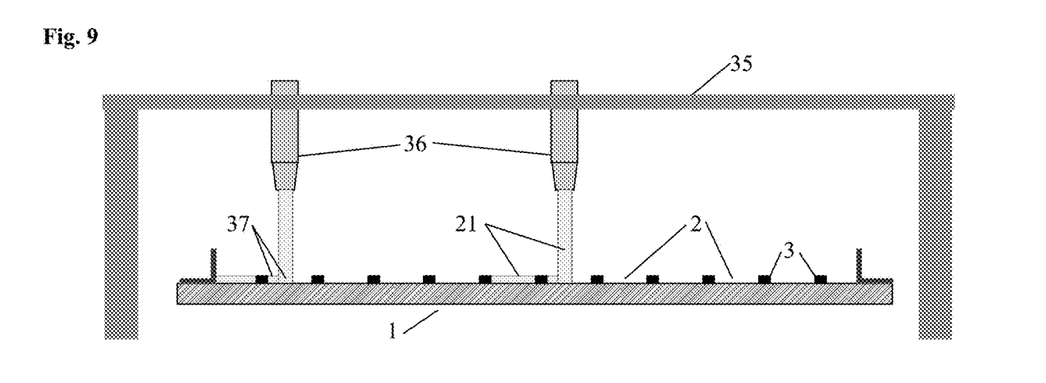
FIG. 9 is show dispensers, supported by a gantry, discharging material onto a form face.

In another embodiment, as shown in FIG. 9, 3D dispensers 36 are supported by a gantry 35 that spans the width of a form 1, although any dispenser support system known in the art may be used. In this configuration, the form 1 may move under the gantry 35 or the gantry 35 may move over the form 1 or both the form 1 and gantry 35 may move in some coordinated process. The 3D dispensers 36 moves from mold 2 to mold 2 along the gantry 35, after dispensing material 21 in a mold 2. Depending upon the mold size and the 3D dispenser's limitations, the 3D dispenser makes one or more passes over the mold 2 by either the 3D dispenser 36 or gantry 35 moving back and forth. Multiple 3D dispensers on a single gantry can be synchronized to dispense in unison or may dispense independently. The gantry 35 and 3D dispensers 36 may be designed for the 3D dispensers to move in any number of directions while supported by the gantry 35.

In one embodiment of the present invention, different types of 3D dispensers discharge, i.e. dispense, the face layer material in one of three distinct shapes onto a form face. The first 3D dispenser type is an extruder which discharges a bead shape through its nozzle, similar to a bead of caulk. A bead is defined as generally having a bottom conforming to the form face, at least 0.03" wide and high and extends longer than one inch in length. This is typically the result of a low slump, extruded cementitious material that holds it's nozzle shape and does not self-spread. The second 3D dispenser type is a spray dispenser that discharges a material through its nozzle having a sprayed shape, defined as aimed, scattered particles sprayed, or similarly discharged under pressure onto a form face. Sprayed shapes usually build-up thorough cumulative passes and includes speckles, splashes, splatter and the like and generally have minor or no self-spreading from the point of impact on the form face. The third 3D dispenser type is a pouring dispenser that discharges a material having a poured shape, defined as a higher slump, free form cementitious material that is poured, pumped, streamed or similarly discharged onto a form face and self spreads and generally self levels from it's point of discharge over some amount of form face.

Each type of 3D dispenser is computer controlled to discharges it's material on a form face. A CAD file designates the thickness for the discharged material at all points over the form face being cast. As such, the CAD designated thickness of a face layer cast by either a spraying or pouring 3D dispenser may be arrived at cumulatively. Whereas for a extruder 3D dispenser, the thickness of a bead may be created by either using a nozzle with an opening size consistent with at least the designated bead's height, i.e. thickness, or for the 3D dispenser to build-up the bead cumulatively. In all cases it is important that the cementitious materials have the correct physical properties to be adequately discharged from the various 3D dispenser types. For example if the 3D dispenser is to discharge a bead, the material must have a low-slump and be stiff enough to retain its three dimensional shape after being extruded onto a form face. Or, the material must be sufficiently liquefied to enable a spray 3D dispenser to spray the material onto the form face. The distinct shapes may be discharged onto the form face to create only a part of or the entire face layer. For example a 3D dispenser may discharge several bead lines of a form face, after which the entire form is manually sprayed with a different colored cementitious material.

Limiting 3D dispenser discharge shapes ensures high quality precast surfaces and fast manufacturing. As such, certain discharge shapes are specifically excluded from the above distinct shapes. Specifically, round dots, clumps, narrow lines (less than 0.06" wide) and scratched discharged shapes are all excluded. Dots and narrow lines are too small to accomplish any meaningful design on a large wall panel face and clumps are difficult to adequately spread over a form face. Clumps are herein defined as lower slump cementitious materials that lands on a form face in piles and barely self spreads over the form face and thereby are difficult to use as a face layer. As such, processes and/or panels resulting in face layers produced from discharged clumps are excluded from this invention. Although clumps may be used for backing layers since such low slump material is easily spread with vibration that has a minimal effect on the face layer. This includes that part of a backing layer that covers a vertical divider's crown and results in the backing layer providing exposed grout lines, or the like, on the panel's face.

A CAD/CAM wall panel uses special computer codes programmed during the CAD stage and implemented during the CAM stage as is well known in the art. One well known CAD/CAM code is G code which is a programming language for computer numerical control (CNC) that instructs machines where and how to move and what to do. For example, such a code can be used in CAD to designate multiple 3D dispensers to each discharge its contained material, in accordance with the dispenser's distinct shape, in a set pattern and to a designated thickness over one or more specific areas of a form face.

Regardless of the code used, preparing to manufacture the face layer of a multi-colored wall panel involves opening a CAD program in a CAM computer and filling the 3D dispensers. Each 3D dispenser is configured with a nozzle to produce its assigned distinct shape and filled with each dispenser's respective integrally colored material. When multiple 3D dispensers are used, at some point during casting a form face, at least one 3D dispenser contains a different colored material than that of the other 3D dispensers. The CAD program assigns each 3D dispenser to discharge its material in a particular way over one or more designated form face areas. As such, the 3D dispensers are prepared to discharge one or more distinct shapes of two or more integrally colored materials over a designated form face area and in the designated thickness as per the CAD program. Therefore, while each 3D dispenser is programmed to only discharge its distinct shape of its material over its assigned form face area(s), each designated area will be covered with material. In other words, all of the 3D dispensers combined will discharge two or more colored materials over the entire designated form face area programmed to be covered with the material.

In addition, more than one 3D dispenser, with the same or different distinct shape, may discharge its material over the same designated form face area. For example a 3D dispenser may discharge a bead, representing a marble vein, over a designated form face area consisting of thin line(s), followed by a different 3D dispenser pouring or spraying a different colored material on top of and around the vein, in a designated area encompassing the vein's designated area.

Dispensers may be refilled during the casting of a form with the same or a different material and/or reconfigured with a different nozzle to produce a different distinct shape. Each time a 3D dispenser is reused with a different material or different distinct shape, it is considered to be a new 3D dispenser with programming different from its prior use. As such, a single 3D dispenser may be reused to discharge all of the different colored materials, in one or more distinct shapes, on a form face and thereby considered to be multiple 3D dispensers.

Prior to casting, forms must be set in a predetermined position relative to the 3D dispensers and other casting equipment in order for the 3D dispensers to precisely discharge their material in designated form face areas. Such a position may be on a conveyor belt, cart or other device that moves the form through one or more casting stations or the form may be in a fixed location with the 3D dispensers and other CAM casting equipment brought to the form. Position also means the form orientation such as the form is in a face up position. In addition, once a fixed form is set in a predetermined position it shall always have been set in position prior to all subsequent castings.

A panel face layer is the first layer to be cast in the form and is cast face down. This face layer is relatively thin, ranging from 0.01" to 1" thick, although typically around 0.06" to 0.20" thick. The face layer may be comprised of any cementitious material that can be cast by a 3D dispenser and are defined as a powdered binder mixed with water, aggregates and optional additives and/or fibers, to form a concrete. Such powdered binders include well known cements such as Portland cement, calcium aluminate cement, calcium sulfoaluminate cement, various magnesium and/or phosphate cements and similar binders. One example of a facing material is an elastomeric Portland cement mix well known in the art and used as an EIFS (exterior insulated finish system) base and/or finish coat. A variety of optional additives and fibers are well known in the art, some of which enable the cementitious material to reduce or eliminate abrasive materials.

The use of powder material mixes or powders mixed with silica sand having a 20 or higher mesh for the face layer, combined with the manner in which the dispensers discharge the face layer on a form face, greatly minimizes any form face abrasion. This enables forms to have more uses as well as facilitates the use of weaker form materials such as plastic or coated wood as opposed to the typical steel or fiberglass forms used in precast.

Backing Layers are one or more layers of materials that provide backing to the face layer and are directly or indirectly on and bonded to the backside of the face layer. A first backing layer is directly on and bonded directly to the backside of the face layer. All additional backing layers are indirectly on and indirectly bonded to the backside of the face layer. At least one backing layer must be comprised of the above described cementitious materials and will typically be a monolithic slabs ranging from 0.1/2" to 6" and may be reinforced with fibers and/or mesh, and/or other reinforcement materials known in the art. In one preferred embodiment a face layer is backed by such a cast cementitious material, as a first backing layer, bonded to the backside of the face layer and having mesh embedded on it's front side, i.e. the side touching the face layer. A second backing layer of spray polyurethane foam is bonded to the backside of the first backing layer. In this configuration the first backing layer provides impact resistance for the face layer while the second backing layer provides the panel with thermal insulation as well as an air, vapor and moisture barrier.

Backing layers may also be coatings, cast materials or sheets, as long as each layer is bonded to the backside or a prior layer. Sheets, such as plywood or foam boards may be bonded to the backside of a face layer with a coating layer with or without reinforcement. The panels various layers are bonded together by either adhesion or cohesion with adhesion being the action or process of adhering, i.e. sticking fast to a surface or substance. Cohesion is like molecules sticking together, such as two layers having the same binder although different filler materials. Bonded or bonding as used herein shall only refer to an adhesive or cohesive bond. A composite panel is created by two or more layers being bonded together. Backing layers may be bonded to the face layer or to a prior backing layer by any process and equipment with or without computer control.

The polyurethane foam referenced herein is any self-bonding, liquid applied foam, made from polyurethane, polyisocyanurate or other chemicals in whole or in part, that is typically cast by spraying or pouring, expands and self-bonds to materials it comes in contact while it is expanding. Although it is a self-bonding, adhesive foam, in some cases it may be desirable to use it in conjunction with a separate bonding material. The polyurethane foam is closed cell and has a density of less than eight pounds per cubic foot and more preferably less than 3.2 pounds per cubic foot and even more preferably less than 2.5 pounds per cubic foot.

Figure 10:
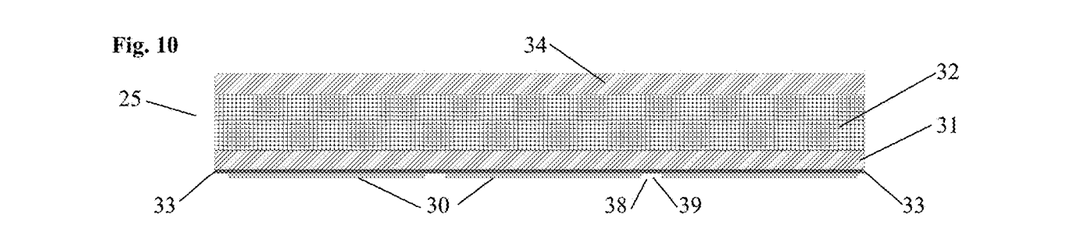
FIG. 10 is a section view of a multi-layered, finished wall panel.

In another embodiment, sheet materials used as backing layers facilitates printing a brick or stone face on large structural insulated panels, i.e. SIPs. FIG. 10 shows a section view of a finished wall panel 25 having a face layer 30 cast by a computer controlled 3D dispenser face down in a form and comprised of individual sections separated by a gap 39 which creates exposed mortar lines 38. The face layer 30 is backed by a first backing layer 31, comprised of a sheet of plywood or other sheet material which is bonded to the face layer 30 by a cementitious coating layer 33. In addition to being cast on top of the face layer 30, the coating layer 33 was also cast on top of the vertical dividers' crowns, which caused the coating layer to be exposed mortar lines 38 on the finished panel's face. A second backing layer 32, which is a foam in this configuration, is then bonded to the plywood used as the first backing layer 31. A third backing layer 34, which may be another sheet of plywood is then bonded to the foam, i.e. second backing layer 32. The result is a full wall structural insulated panel having a printed face comprised of exposed mortar lines separating bricks or stones. In addition, the first backing layer 31 and/or the third backing layer 34 of FIG. 10 may be a reinforced cast cementitious material bonded to the other layers. Once the cast material cures, it becomes the SIP's sheet-like skin(s).

A panel's perimeter, i.e. top, bottom, front end and back end, may be formed by the form's perimeter or by surface forms positioned on the form's surface, away from the form's perimeter. In addition to forming a panel's perimeter, surface forms may also form window and door or other opening within a panel's perimeter. As such, surface forms contain the face and/or backing layers within the confines of a wall panel's cementitious cast area. Each surface form may have a bottom contoured to the form face on which it sits and a vertically oriented face, against which the material to be formed is cast. Contouring the surface form's bottom prevents the liquid face layer from leaking outside of the formed area on those irregular form faces where vertical dividers would otherwise prevent a flat bottomed form from forming a mold's surface face. This is necessary since surface forms will result in partitioning individual molds and computer controlled dispensers programmed to cast only enough material to fill the partitioned mold. While minimal leakage may be acceptable, too much or too little material cast in a partitioned mold may adversely affect a panel's appearance.

Surface forms for a brick faced form, for example, with vertical dividers in a fixed grid and molds with flat surfaces may be used at numerous different form locations since it's bottom matches much of the form's surface. However, those forms having randomly placed molds of different sizes and vertical dividers, require fabrication of a special surface form for each panel with different dimensions.

Figure 11:
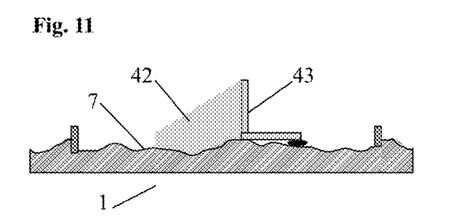
FIG. 11 is an angle iron used as a vertical form for a surface form cast on a form face.
Figure 12:
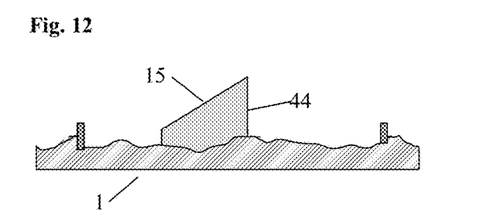
FIG. 12 is the molded surface form of FIG. 11.

Surface forms 15 may be fabricated by molding on a form, or an identical form, on which a panel is to be cast. As shown in FIG. 11 a vertical form 43, such as an angle iron, is positioned at or near the end of panel location and leveled. Mold material 42 is then cast against the vertical form 43 and the form face 7. Once the mold material hardens the resulting surface form 15 is removed from the forms and the side cast against the vertical form 43, becomes the surface form's vertical face 44 after being trimmed to remove mold material that leaked under the vertical form 44. The surface form 15 is then ready for positioning at the same location on an actual casting form as shown in FIG. 12. Such surface forms may also be positioned a distance away from the end of panel and resulting in a longer panel with the excessive panel length or height cut away after the panel is removed from the form.

In another configuration a surface form may sit on top of the vertical dividers without partitioning the molds beneath with the excess material cut away after the panel is removed from the form. For example a 3D dispenser may be programmed to fully cast each of the molds through the end of panel boundary. After an casting the face layer, an end of panel surface form is positioned on top of vertical dividers and above boundary area molds filled with the face layer. A backing layer is then cast over the face layers up to the end of panel form, resulting in covering only part of the face layer molds under the end of panel form. Any excessive face layer not covered by the backing layer is then cut off after removing the panel from the form.

Figure 13:
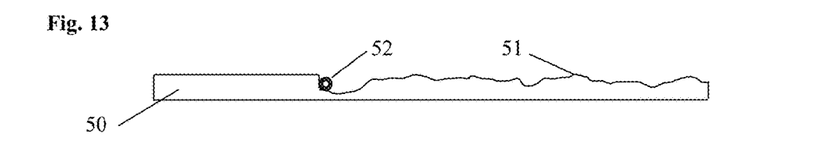
FIG. 13 is a surface form being milled to the contour of a form face.

In another configuration a surface form is fabricated by cutting the bottom edge of one or more thin bars, legs, flanges or other objects to match the a form face over a specific plane. FIG. 13 shows bar 50 being milled with a rotary cutter 52 controlled by a CNC machine which is well known in the art. The resulting contoured edge 51 fits the form face 7 configuration in the precise locations where the form side is to be positioned. Contoured edges may also be cut on both channel flanges, for example, to obtain a more stable surface form. The CNC machine uses CAD/CAM to identify the surface form's location on a form in conjunction with the 3D mapping coordinates for the form's surface topography at that specific location.

In another configuration a surface form 15 forms a flat surface area on a irregular form face to facilitate adhering moulding, cornerstones and other features to the panel face. FIGS. 14 to 17 show the process for creating such a flat surface area around a panel opening for a window. FIG. 14 shows a form 1 with an irregular form face 7 having a multitude of vertical dividers 3 and two surface forms 15 positioned on each side of a planned panel opening and secured with a brace 57. Each surface form 15 has a descending leg 53 with a contoured edge 51 that interfaces with the form face 7, a flat horizontal section 54 and an ascending leg 55. The horizontal section 54 has a width equal to the dimension of the panel's planned flat section 56 and sits on top of the form face 7 which includes the vertical dividers 3. The surface form in this configuration may also be made from a channel with both flanges, i.e. descending legs, contoured and sitting on the form face and having an attached ascending leg.

Figure 15:
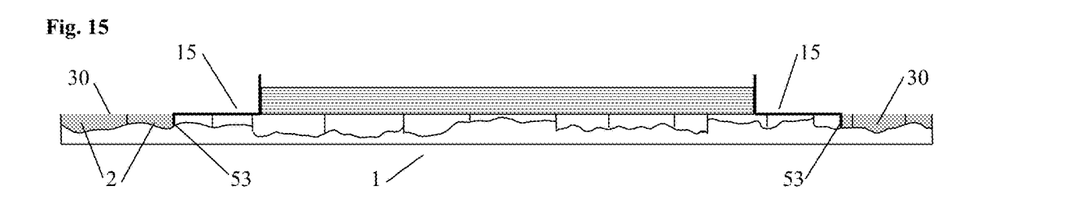
FIG. 15 is FIG. 14 with a face layer cast on the form face outside of the surface forms.
Figure 16:
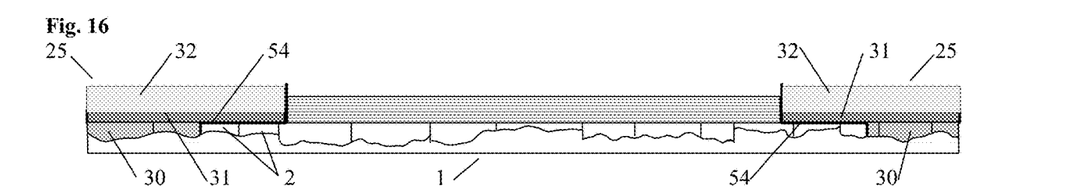
FIG. 16 is FIG. 15 with two backing layers.

FIG. 15 shows FIG. 14 with a face layer 30 cast into the full and partial molds 2 outside the surface forms' descending legs 53. FIG. 16 shows FIG. 15 with a first backing layer 31 bonded to the face layer 30 and a second backing layer 32 bonded to the first backing layer 31 to comprise a finished panel 24 still in the form 1. The surface forms' descending legs 53 prevented the face layer 30 from leaking into the area of the molds 2 that is under the surface forms' horizontal section 54.

Figure 17:
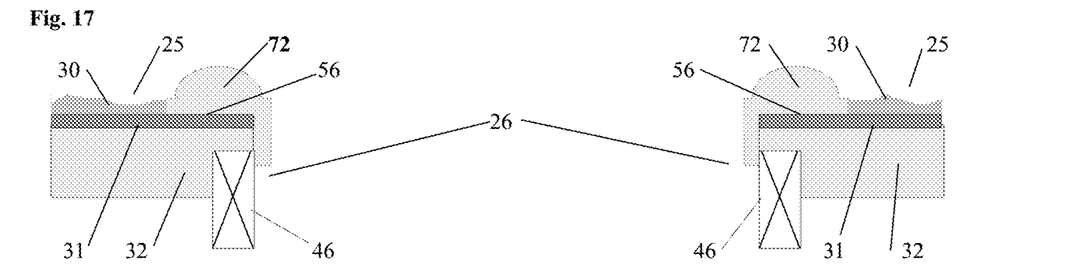
FIG. 17 is a finished wall panel to which mouldings on both sides an opening is bonded.

FIG. 17 shows the finished wall panel 25 comprised of a face layer 30, backed by a first backing layer 31 which is backed by a second backing layer 32 of polyurethane foam. The finished panel 25 has been removed from the form 1 and had the surface forms 15 removed to show a panel opening 26 which may be for a window, for example. Also shown is moulding 72 on both sides of the opening 26 that are adhered to the panel's flat sections 56 created by the surface forms. Finally, a wall frame 46, comprised of wood or metal studs and well known in the art, is shown embedded in the polyurethane foam second backing layer. The foam bonds the frame 46 to the panel 25.

The surface form configuration shown in FIGS. 14 to 16 may also be used to facilitate windows and doors being positioned on the panel face, as opposed to being recessed. In this case the surface form has a more narrow horizontal section on to which a window or door frame flange or a casing may be positioned.

Panels fabricated for recessed windows or doors creates a return into the opening that must have a finished appearance. A finished return is a panel opening having a return with a finished appearance such as the panel finished face layer continued onto the return or by stucco or moulding placed on the return. FIG. 17 shows a moulding 72 having a finished return 73.

A face layer continued onto a return may be accomplished by precasting shortened panel face layer bricks and stones having a 90° return on one end. Such pieces are set in the molds surrounding an opening before casting and bonded to the cast face layer and panel by a backing layer. In another configuration, a face layer return may be attained by spraying a face layer on the vertical side of a form protruding from the form face around the opening's perimeter.

Figure 18:
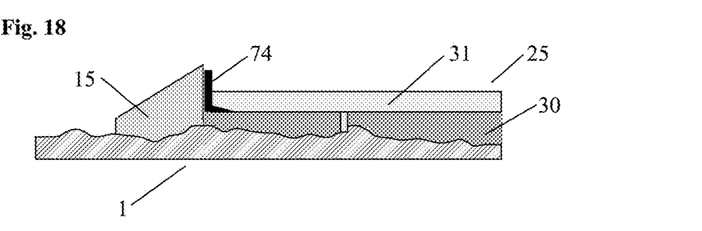
FIG. 18 is precast refractory edge providing fire protection for a foam backing layer.

In another embodiment for those panels having foam or other combustible material backing layer, special edges may be used to protect the material. FIG. 18 shows a precast angle edge 74 made from a refractory material and positioned next to a surface form 15 on the backside of a face layer 30 in a form 1. A cast backing layer 31 covers one leg of the angle edge 74 and thereby bonds it to the wall panel 25. The edges 74 may be of any shape or material and may be used around the perimeter of opening or around part of all of a panel's perimeter. If the edges are made of a refractory material, it can prevent a fire's flames from reaching adjoining panels.

Figure 19:
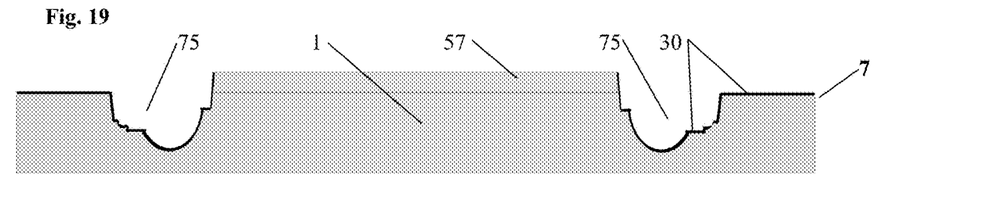
FIG. 19 is a form with two recessed areas, for casting moulding, separated by an open space and showing a face layer having been cast on the form face.
Figure 20:
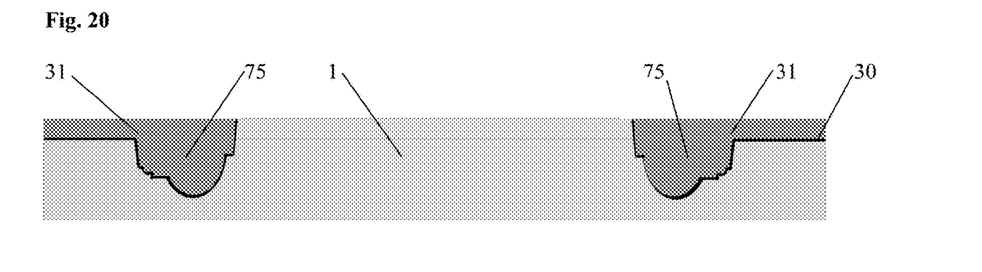
FIG. 20 is FIG. 19 with a backing layer bonded to the face layer.

In another embodiment the forms have recessed areas for casting various moulding such as bands, cornice, crown and moulding surrounding windows and doors. FIG. 19 shows a form 1 having two recessed areas for a window moulding form 75 on both sides of an opening into which an opening brace 57 is positioned. Also shown is a face layer 30 sprayed in the moulding form 75 area and poured or sprayed onto the flat area of the form face 7. FIG. 20 shows FIG. 19 with a backing layer 31 cast onto the backside of the face layer 30 in the moulding form 75 area and on the flat area of the form 1. The backing layer 31 is applied over the entire face layer's backside and thereby tying the recessed areas to the rest of the face layer.

Figure 21:
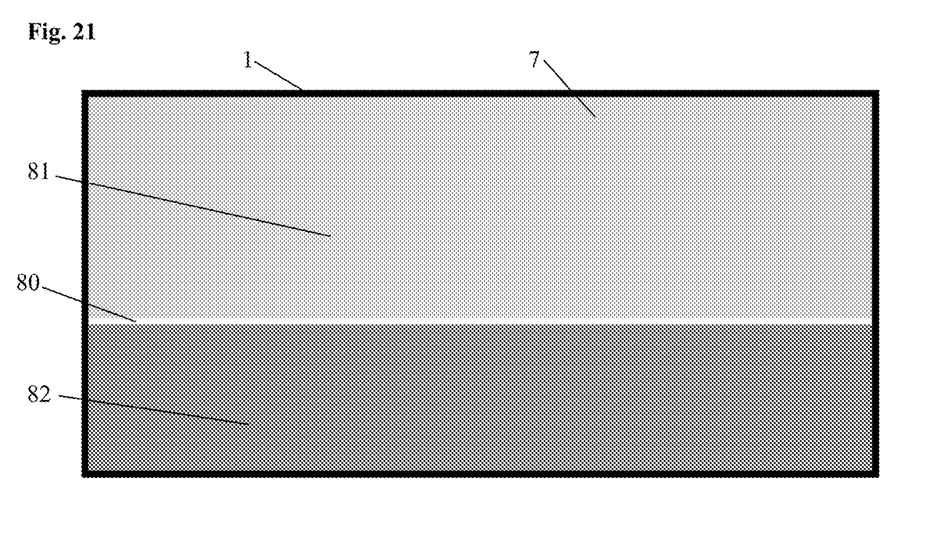
FIG. 21 is two large sections of a face layer separated by a borderline in a form.

In another configuration, a bead shape may be discharged onto a form face to create a borderline for different face layer materials and/or material colors. For example, FIG. 21 shows a first color material discharged, by a computer controlled 3D dispenser, in a bead shape, over a form face 7 to produce a borderline 80 that separates the form face into two a first area 81 and a second area 82. A second colored material is then poured or sprayed into the first area 81 and a third colored material is poured or sprayed into the second area 82. The result is a multi-colored wall panel having two colored areas separated by a pinstripe. As such, 3D dispensers may be used to cast borderlines to create almost any multi-colored and/or multi-material face layer without permanent or temporary vertical dividers on the form face.

A borderline is defined as a three dimensional demarcation that distinctly separates a cementitious face layer into two or more different colored sections as exposed on a wall panel's face. Each three dimensional demarcation is from 0.06" to 12" wide, less than 60' long and with a thickness from 0.01" to 1". FIG. 21 shows a borderline 80 that separates different colored materials 81 and 82 on either side of the borderline 80. Distinctly separates means that the borderline stands out in color and/or shape in noticeable contrast to the adjacent area(s).

A colored borderline is cast on a form face by 3D dispensers discharging a colored material to some thickness on the form face and/or by a colored backing layer that covers the vertical divider's crown and become exposed grout lines, for example, on a wall panel's face. In the case of discharged colored material, only the distinct shapes of a bead and spray can be used to produce borderlines.

Figure 22:
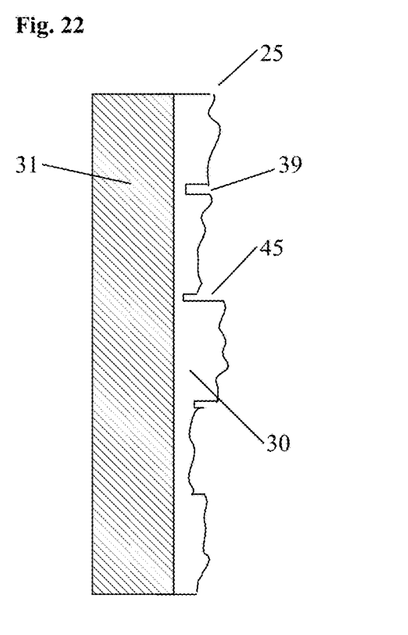
FIG. 22 is a cross section of a precast wall panel having a stacked stone face layer showing gaps and ledges between the stones.

A shaped borderline is some type of distinct separation from one object to the next, such as stack stones where there may be a noticeable gap between adjacent stones and/or a sharp, e.g. 90°, ledge exposing the side of a stacked stone. FIG. 22 shows a cross section of a cast wall panel 25 having a stacked stone face layer 30 and a backing layer 31. The simulated, individual stacked stones are distinguished from one another by gaps 39 or ledges 45 that provide a clear contrast from one simulated stone to the next and thereby make them look like separate stacked stones.

Figure 23:
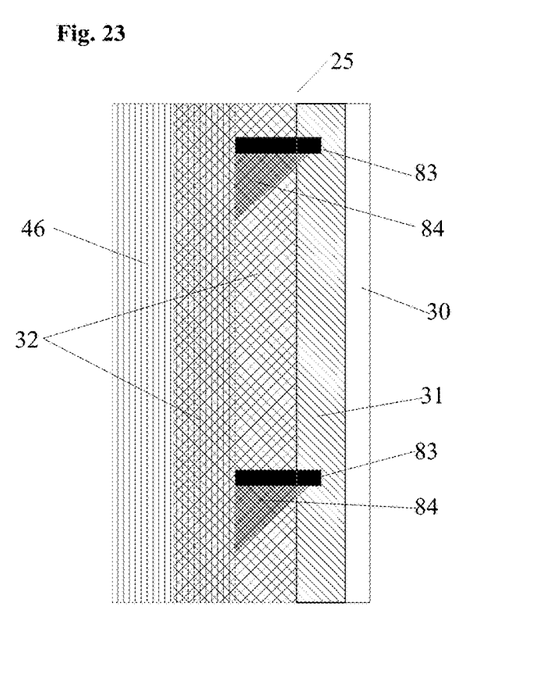
FIG. 23 is a cross section of a precast wall panel with a frame and attached anchor supporting a horizontal rib all embedded in a polyurethane foam backing layer.

In another embodiment ribs are embedded in one or more of the wall panel's backing layers. FIG. 23 shows a cross section of a wall panel 25 having a cementitious face layer 30 and backing layer 31 as well as a second backing layer 32 comprised of polyurethane foam. The foam is bonded to the backside of the cementitious backing layer 31 and to a wall frame 46, which is represented by a stud in this drawing. As such, the frame 46 is embedded in the foam 32 (second backing layer) and thereby the polyurethane foam bonds the wall frame to the face and backing layers. Also shown in FIG. 23 are anchors 84 attached to the frame 46 by any method known in the art. The anchors are embedded in one or more backing layers and may be made of any rigid material capable of supporting ribs 83 and/or capable of supporting the cementitious layers if the foam has melted away. The ribs 83 extend horizontally from anchor to anchor 84, which are supported by adjacent studs in the frame 46. The horizontal ribs 83 are thin, elongated strips of wood, metal, plastic or any other rigid material that are embedded in at least the second backing layer 32 (foam layer) and may also be embedded in the backing layer 31 and possibly the face layer. The ribs 83 act to reinforce all layers since the layers are bonded together.

In addition to reinforcing the face layer, the backing layer also bonds the face layer's various sections, as divided by borderlines, together to create a unified wall panel face. In the case of a bead or sprayed distinct shaped borderlines, the bead or sprayed material and the different colored contiguous material are separately discharged on the form face and may have a weak interface, as such the backing layer ensures the two sections are adequately bonded together as part of a wall panel. In the case of vertical dividers, which physically separates face layer sections, the backing layer is the only way by which the sections are bonded together.

In another embodiment, a face layer may comprise geometric shapes separated by borderlines. While forms having vertical dividers may be used, the more likely process is to use dispenser discharged distinct shapes to create the borderlines.

From the description above, a number of advantages of some embodiments of the additively manufactured wall panel become evident:

(a) The inventive subject matter enables computer controlled 3D dispensers to discharge different colored face materials in a myriad of wall panel designs.

(b) The inventive subject matter enables the multi-colored wall panel designs to include colored grout lines separating different colored bricks or stones on a wall panel face.

(c) The inventive subject matter enables colored grout lines to be cast by 3D dispensers instead of using form liners to distinguish the grout lines from the bricks or stones.

(d) The inventive subject matter enables 3D dispensers to be programmed to print a granite wall panel face by spraying multiple passes of different colored speckles on a form face.

(e) The inventive subject matter enables wall panels may to be simply manufactured with multi-colored, geometric shapes using CAD/CAM.

(f) The inventive subject matter enables 3D dispensers to be programmed to print marble veins on a form face and to spray or pour a swirled color over and around the veins to produce a marble wall panel face.

(g) The inventive subject matter enables wall panel design and manufacturing to be highly automated using computer aided design and computer aided manufacturing.

(h) The inventive subject matter enables special surface forms to be used to provide clean panel edges on a heavy textured mother form and thereby get more production out of the mother form.

(i) The inventive subject matter enables lower costing forms to be used since the cementitious face layer cast against the forms contains little or no abrasive materials.

(j) The inventive subject matter enables wall panels to be cast with protruding window and door mouldings of the same or different color than the adjacent flat wall face area.

(k) The inventive subject matter enables spray polyurethane foam to be applied to the backside of a wall panel to provide support and continuous, exterior insulation for a building that uses the wall panels.

(l) The inventive subject matter enables spray polyurethane foam to be used to provide an air, vapor and moisture barrier to a precast wall panel.

(m) The inventive subject matter enables spray polyurethane foam to be used to automatically bond a structural frame to a precast wall panel.

(n) The inventive subject matter facilitates the utilization of a CAD/CAM in the design and production of precast wall panels Although the description above contains many specifications, these should not be construed as limiting the scope of the embodiments but as merely providing illustrations of some of several embodiments. Thus the scope of the embodiments should be determined by the appended claims and their legal equivalents, rather than by the examples given.

What I claim is:

1. A method of additively manufacturing a multi-colored wall panel comprising:
   a. setting a form having a form face into a predetermined position relative to multiple computer controlled 3D dispensers with at least two said dispensers filled with a different colored cementitious materials, and b. discharging at least one distinct shape of said material by said dispensers with each said dispenser discharging its respective said material over its respective designated area, in a design designated thickness, over said form face to create a face layer and said face layer is distinctly separated by one or more borderlines, and c. casting a cementitious backing layer on and bonded to the backside of said face layer, and d. curing said wall panel's layers in said form until said panel is sufficiently hardened for removal from said form, whereby a multi-colored wall panel is additively manufactured.

2. The method of additively manufacturing a multi-colored wall panel of claim 1 wherein a polyurethane foam backing layer is bonded to the backside of said cementitious backing layer.

3. The method of additively manufacturing a multi-colored wall panel of claim 2 wherein said foam bonds a frame to the backside of said wall panel.

4. The method of additively manufacturing a multi-colored wall panel of claim 3 wherein ribs are embedded in said foam to reinforce the wall panel's layers.

5. The method of additively manufacturing a multi-colored wall panel of claim 1 wherein said form face has vertical dividers that result in said borderlines.

6. The method of additively manufacturing a multi-colored wall panel of claim 1 wherein said borderlines are created by distinct shapes discharged by said dispensers on said form face.

7. The method of additively manufacturing a multi-colored wall panel of claim 1 wherein one or more heavy textured surface forms contains said face and/or said cementitious backing layer.

8. A method of additively manufacturing a multi-colored wall panel comprising:

a. preparing multiple computer controlled 3D dispensers to discharge one or more distinct shapes of two or more integrally colored, cementitious materials over a designated form face area and in a designated thickness as at least part of a face layer of a multi-colored wall panel, and b. setting a form having said form face into a predetermined position relative to said dispensers, and c. discharging one said distinct shape of one said material by one said dispenser over each said designated area, in a design designated thickness, over said form face to create at least part of a face layer and said face layer is distinctly separated by one or more borderlines, and d. casting one or more backing layers on and bonded to the backside of said face layer, with at least one said backing layer comprising a cementitious material, and e. curing said wall panel's layers in said form until said panel is sufficiently hardened for removal from said form, whereby a multi-colored wall panel is additively manufactured.

9. The method of additively manufacturing a multi-colored wall panel of claim 8 wherein a polyurethane foam backing layer is bonded to the backside of said cementitious backing layer.

10. The method of additively manufacturing a multi-colored wall panel of claim 9 wherein said foam bonds a frame to the backside of said wall panel.

11. The method of additively manufacturing a multi-colored wall panel of claim 10 wherein ribs are embedded in said foam to reinforce the wall panel's layers.

12. The method of additively manufacturing a multi-colored wall panel of claim 8 wherein said form face has vertical dividers that result in said borderlines.

13. The method of additively manufacturing a multi-colored wall panel of claim 8 wherein said borderlines are created by distinct shapes discharged by said dispensers on said form face.

14. The method of additively manufacturing a multi-colored wall panel of claim 8 wherein one or more heavy textured surface forms contains said face and/or said cementitious backing layer.

* * * * *